United States Patent
Bastos et al.

(10) Patent No.: US 7,098,922 B1
(45) Date of Patent: Aug. 29, 2006

(54) MULTIPLE DATA BUFFERS FOR PROCESSING GRAPHICS DATA

(75) Inventors: Rui M. Bastos, Santa Clara, CA (US); John M. Danskin, Cranston, RI (US); Matthew N. Papakipos, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 98 days.

(21) Appl. No.: 10/744,501

(22) Filed: Dec. 22, 2003

Related U.S. Application Data

(63) Continuation-in-part of application No. 10/732,730, filed on Dec. 10, 2003, now Pat. No. 7,015,914.

(51) Int. Cl.
*G06T 1/20* (2006.01)
*G06T 1/00* (2006.01)
*G06T 15/00* (2006.01)

(52) U.S. Cl. ...................................... 345/506; 345/522

(58) Field of Classification Search ................ 345/545, 345/557, 506, 418, 546, 157

See application file for complete search history.

(56) References Cited

U.S. PATENT DOCUMENTS 6,118,452 A * 9/2000 Gannett ...................... 345/418
6,801,203 B1 * 10/2004 Hussain ..................... 345/506

* cited by examiner

*Primary Examiner*—Kee M. Tung
*Assistant Examiner*—Dalip Kumar Singh
(74) *Attorney, Agent, or Firm*—Patterson & Sheridan, L.L.P.

(57) ABSTRACT

Multiple output buffers are supported in a graphics processor. Each output buffer has a unique identifier and may include data represented in a variety of fixed and floating-point formats (8-bit, 16-bit, 32-bit, 64-bit and higher). A fragment program executed by the graphics processor can access (read or write any of the output buffers. Each of the output buffers may be read from and used to process graphics data by an execution pipeline within the graphics processor. Likewise, each output buffer may be written to by the graphics processor, storing graphics data such as lighting parameters, indices, color, and depth.

19 Claims, 15 Drawing Sheets

MULTIPLE DATA BUFFERS FOR PROCESSING GRAPHICS DATA

CROSS-REFERENCE TO RELATED APPLICATIONS

The application is a continuation-in-part of, and claims priority benefit of, co-pending U.S. patent application titled "Multiple Data Buffers For Processing Graphics Data", U.S. Ser. No. 10/732,730, filed Dec. 10, 2003. The subject matter of the related patent application is hereby incorporated by reference.

FIELD OF THE INVENTION

One or more aspects of the invention generally relate to processing graphics data in a programmable graphics processor, and more particularly to writing and reading graphics data associated with a buffer.

BACKGROUND

Current graphics data processing is exemplified by systems and methods developed to perform a specific operation on several graphics data elements, e.g., linear interpolation, tessellation, texture mapping, depth testing. Traditionally graphics processing systems were implemented as fixed function computation units and more recently the computation units are programmable to perform a limited set of operations. Computation units are connected in a "shading pipeline" to perform shading operations. Processed graphics data including pixel color and depth values are output by the shading pipeline and written to output buffers in memory. Conventional graphics systems support three output buffers for writing processed graphics data to: a depth buffer, a front color buffer, and a back color buffer, each with a specific purpose. The output buffer or output buffers are predetermined by an application and communicated to the graphics system using a register write or program instruction. The ability to write processed graphics data to additional user defined output buffers and to directly access each output buffer, including the additional user-defined output buffers, facilitates the development of more advanced shading algorithms.

For the foregoing reasons, it is desirable to support additional output buffers, each output buffer accessible by the shading pipeline.

SUMMARY

Various embodiments of a method of the invention include processing fragment data for multiple output buffers. Fragment data and data read from an output buffer are processed as specified by the fragment program to produce processed fragment data for the multiple output buffers. An output buffer identifier associated with the processed fragment data is determined. The processed fragment data is stored in an output buffer corresponding to the output buffer identifier.

Various embodiments of the invention include a graphics processor configured to produce data for multiple output buffers, each output buffer associated with a unique output buffer identifier. The graphics processor includes an execution pipeline, a read interface, a conflict detection unit, and a write interface. The execution pipeline is configured to process graphics data to produce processed graphics data for the multiple output buffers and determine at least one output buffer identifier associated with the processed graphics data. The read interface is configured to read processed graphics data associated with an output buffer identifier from an output buffer stored in a memory. The conflict detection unit is configured to prevent position conflicts. The write interface is configured to write processed graphics data associated with at least one output buffer identifier to an output buffer stored in the memory.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

Figure 7A:
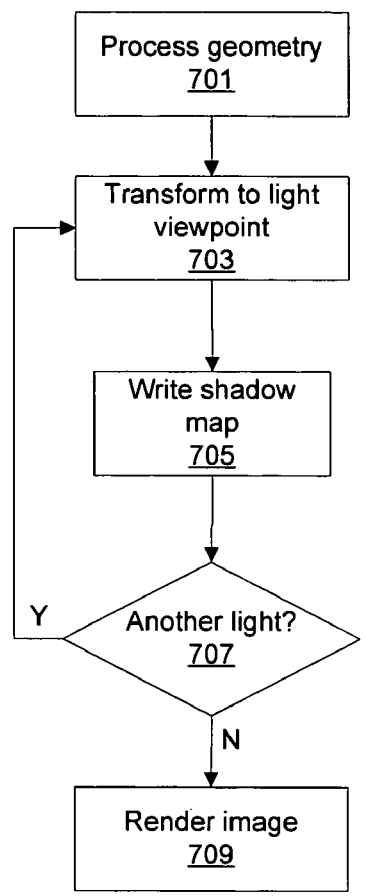
Figure 7B:
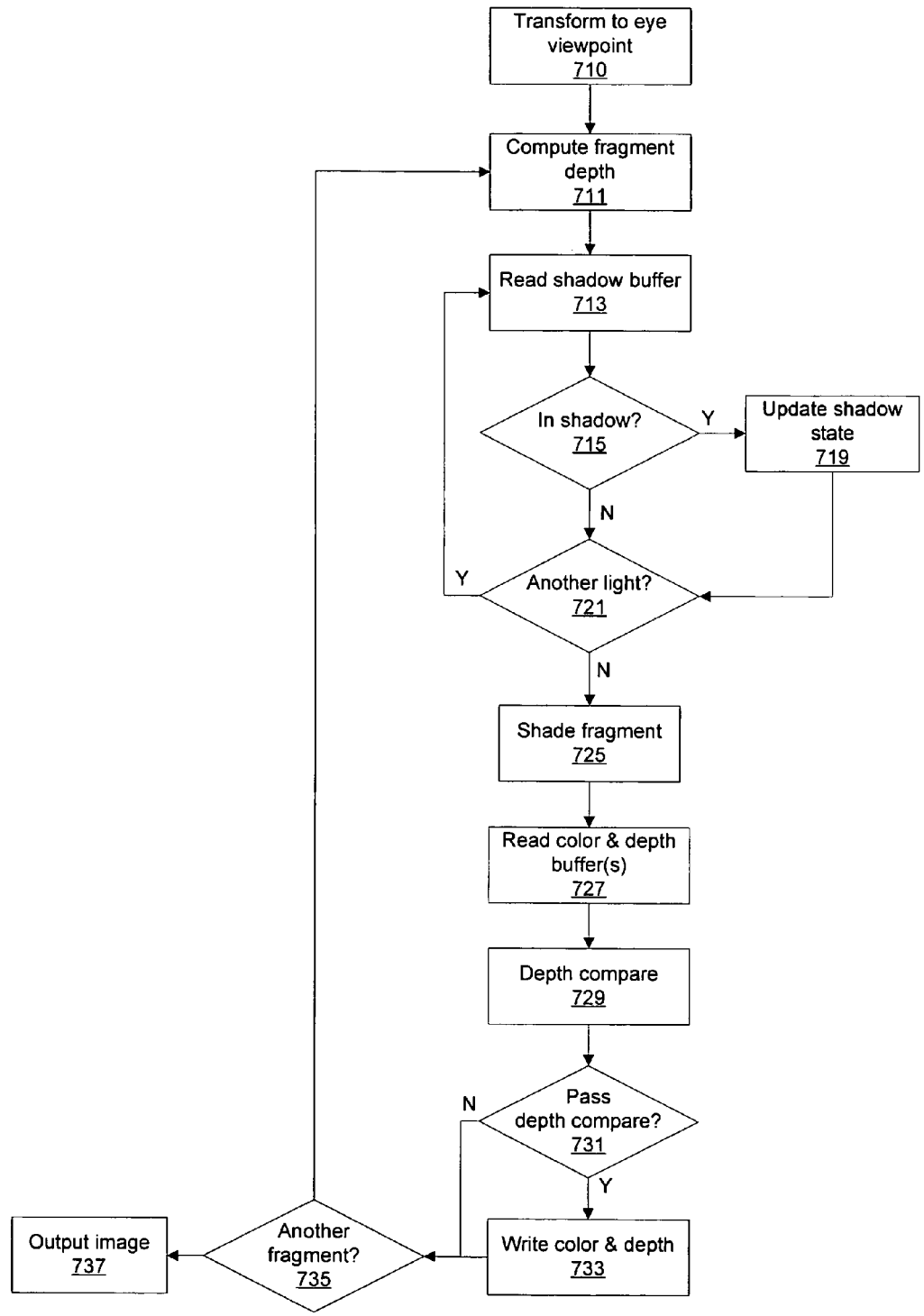
Figure 7C:
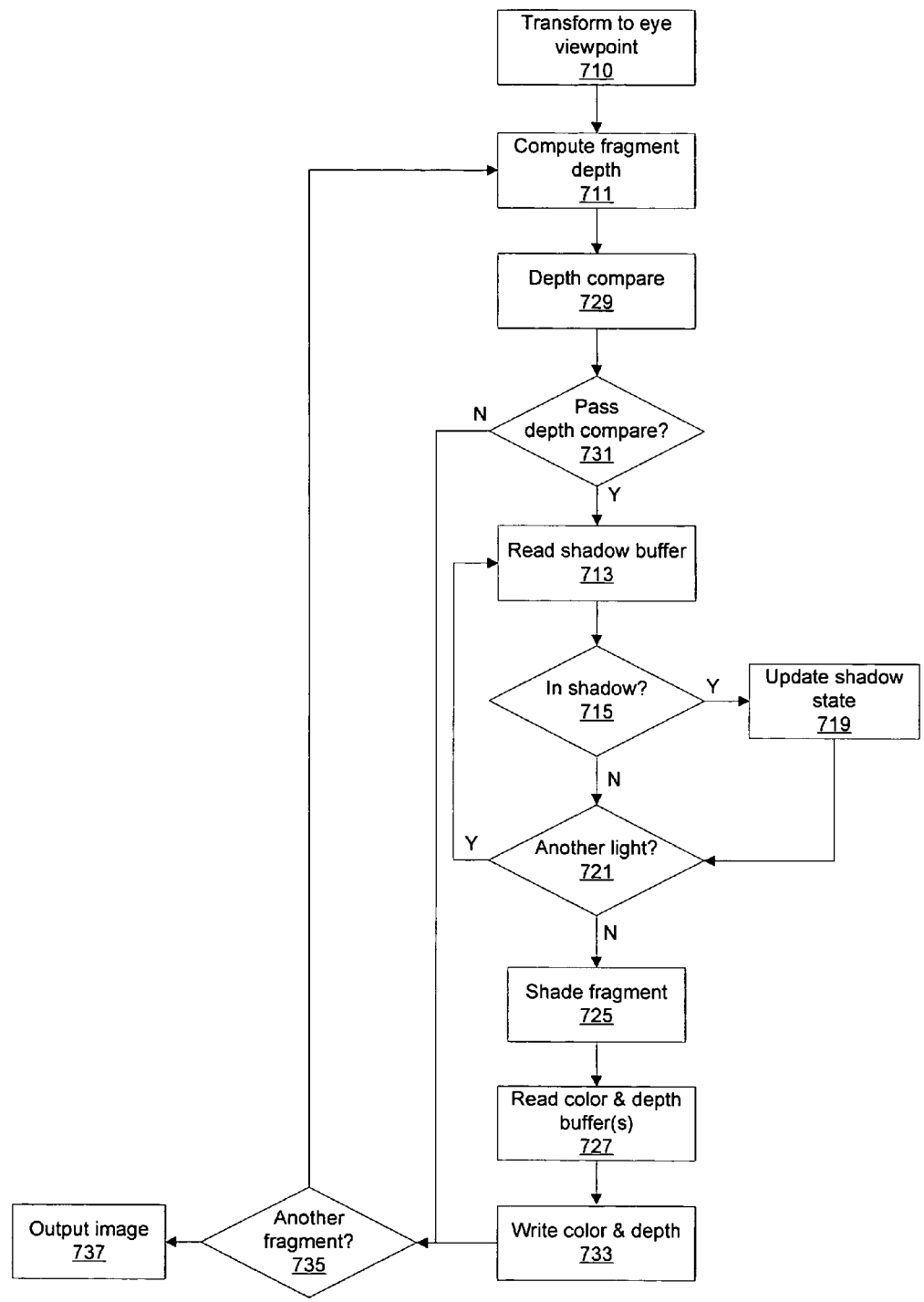

FIGS. 7A, 7B, and 7C illustrate embodiments of methods of shadow mapping using multiple shadow buffers in accordance with one or more aspects of the present invention.

Figure 8A:
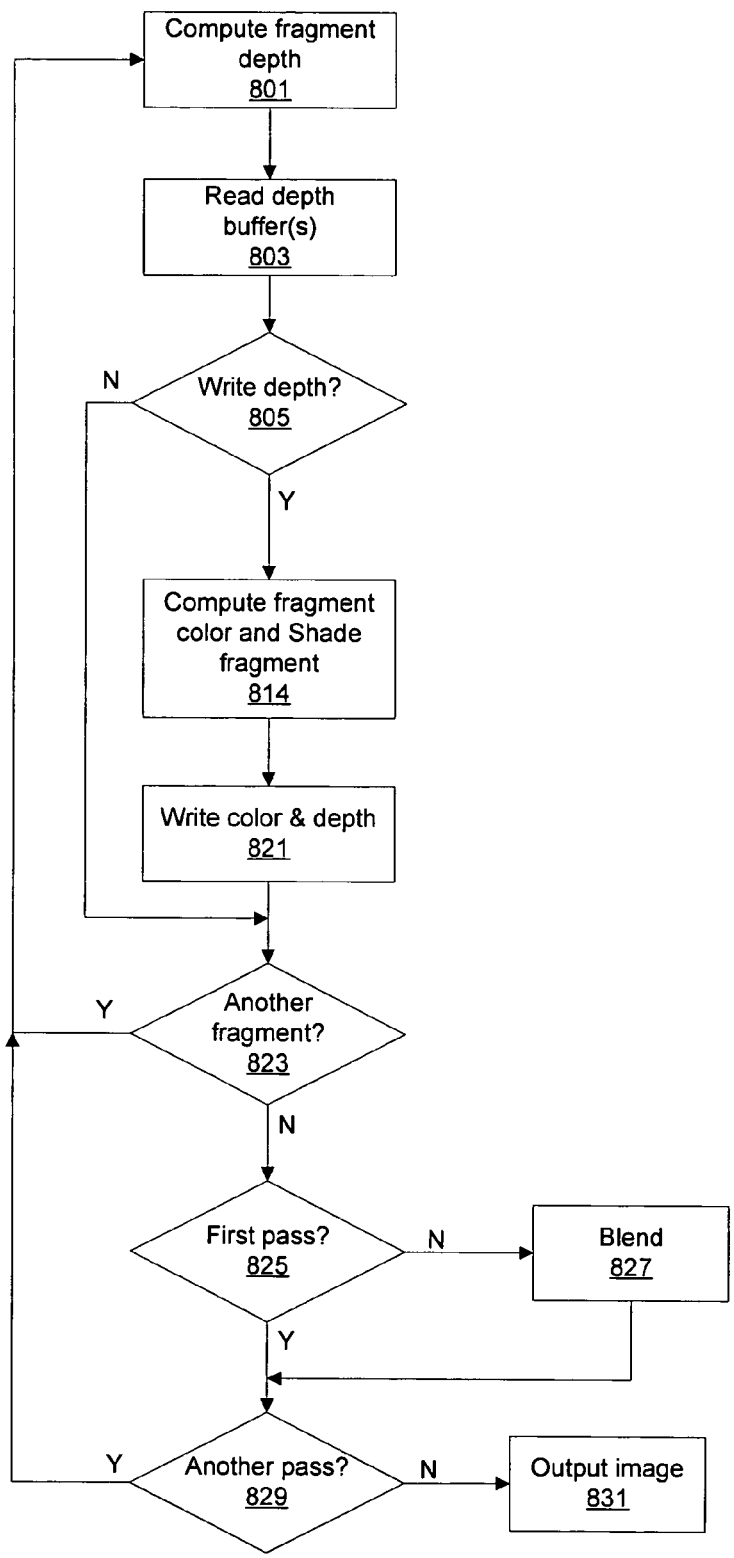
Figure 8B:
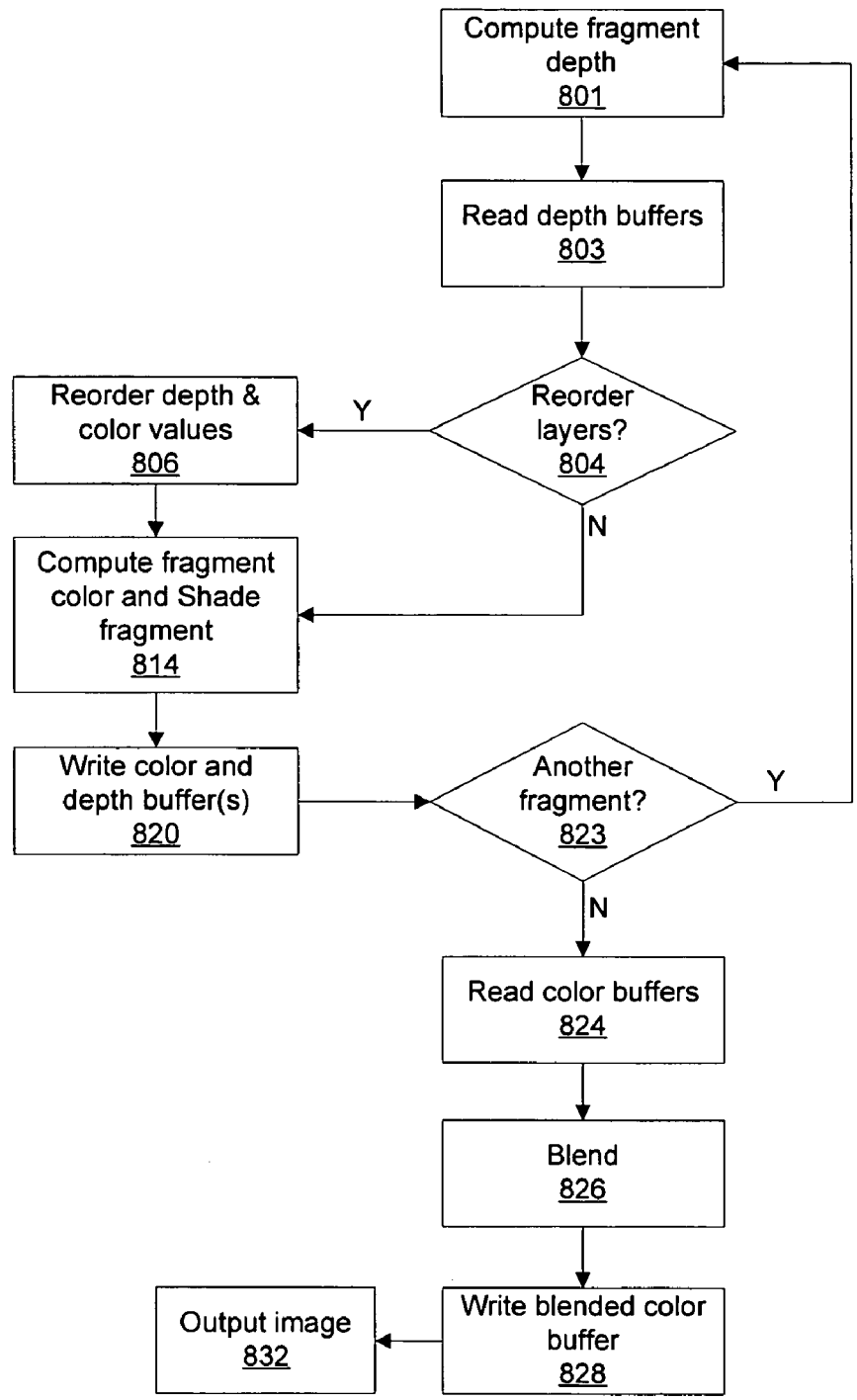

FIGS. 8A and 8B illustrate embodiments of methods of depth peeling in accordance with one or more aspects of the present invention.

DISCLOSURE OF THE INVENTION

The current invention involves new systems and methods for processing graphics data elements using multiple output buffers, each output buffer accessible by a programmable graphics processor.

Figure 1:
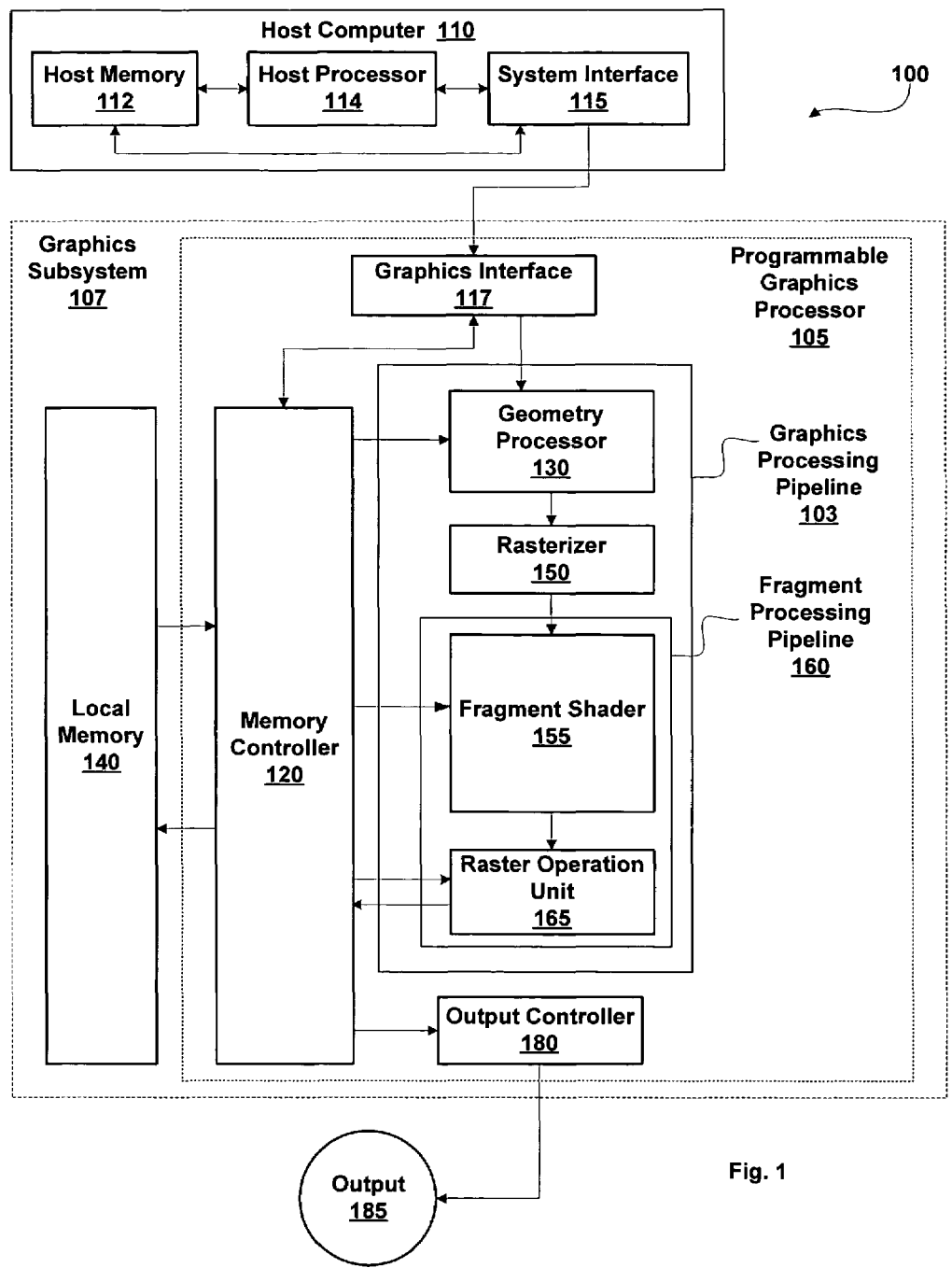
FIG. 1 is a block diagram of an exemplary embodiment of a respective computer system in accordance with one or more aspects of the present invention including a host computer and a graphics subsystem.

FIG. 1 is a block diagram of an exemplary embodiment of a Computing System generally designated 100 and including a Host Computer 110 and a Graphics Subsystem 107. Computing System 100 may be a desktop computer, server, laptop computer, palm-sized computer, tablet computer, game console, cellular telephone, computer based simulator, or the like. Host computer 110 includes Host Processor 114 that may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112. Examples of System Interface 115 known in the art include Intel® Northbridge and Intel® Southbridge.

Host computer 110 communicates with Graphics Subsystem 107 via System Interface 115 and a Graphics Interface 117. Graphics Subsystem 107 may include, without limitation, a Local Memory 140 and a graphics processor, such as, Programmable Graphics Processor 105. Programmable Graphics Processor 105 uses memory to store graphics data in multiple output buffers and program instructions, where graphics data is any data that is input to or output from computation units within Programmable Graphics Processor 105. Graphics memory is any memory used to store program instructions to be executed by Programmable Graphics Processor 105 or output buffers containing graphics data. Graphics memory may include portions of Host Memory 112, Local Memory 140 directly coupled to Programmable Graphics Processor 105, register files coupled to the computation units within Programmable Graphics Processor 105, and the like.

In addition to Graphics Interface 117, Programmable Graphics Processor 105 includes a Graphics Processing Pipeline 103, a Memory Controller 120 and an Output Controller 180. Data and program instructions received at Graphics Interface 117 can be passed to a Geometry Processor 130 within Graphics Processing Pipeline 103 or written to Local Memory 140 through Memory Controller 120. Memory Controller 120 includes read interfaces and write interfaces that each generate address and control signals to Local Memory 140, storage resources, and Graphics Interface 117. Storage resources may include register files, caches, FIFO (first in first out) memories, and the like. In addition to communicating with Local Memory 140, and Graphics Interface 117, Memory Controller 120 also communicates with Graphics Processing Pipeline 103 and Output Controller 180 through read and write interfaces in Graphics Processing Pipeline 103 and a read interface in Output Controller 180. The read and write interfaces in Graphics Processing Pipeline 103 and the read interface in Output Controller 180 generate address and control signals to Memory Controller 120.

Graphics Processing Pipeline 103 may include, without limitation, a geometry processor, such as Geometry Processor 130 and a programmable graphics fragment processing pipeline, such as Fragment Processing Pipeline 160, which each perform a variety of computational functions. Some of these functions are table lookup, scalar and vector addition, multiplication, division, coordinate-system mapping, calculation of vector normals, tessellation, calculation of derivatives, interpolation, and the like. Geometry Processor 130 and Fragment Processing Pipeline 160 are optionally configured such that data processing operations are performed in multiple internal passes through Graphics Processing Pipeline 103 or in multiple passes through Fragment Processing Pipeline 160. Each pass through Programmable Graphics Processor 105, Graphics Processing Pipeline 103 or Fragment Processing Pipeline 160 concludes with optional processing by a Raster Operation Unit 165. Data produced in a pass through Programmable Graphics Processor 105, Graphics Processing Pipeline 103 or Fragment Processing Pipeline 160 may be written to an output buffer in graphics memory including Local Memory 140 and/or Host Memory 112 to be read from at a later time.

Vertex programs are sequences of vertex program instructions compiled by Host Processor 114 for execution within Geometry Processor 130 and Rasterizer 150. Fragment programs are sequences of fragment program instructions compiled by Host Processor 114 for execution within Fragment Processing Pipeline 160. Geometry Processor 130 receives a stream of program instructions (vertex program instructions and fragment program instructions) and data from Graphics Interface 117 or Memory Controller 120, and performs vector floating-point operations or other processing operations using the data. The program instructions configure sub-units within Geometry Processor 130, Rasterizer 150 and Fragment Processing Pipeline 160. The program instructions and data are stored in graphics memory. When a portion of Host Memory 112 is used to store program instructions and data the portion of Host Memory 112 can be uncached so as to increase performance of access by Programmable Graphics Processor 105. Alternatively, configuration information is written to registers within Geometry Processor 130, Rasterizer 150 and Fragment Processing Pipeline 160 using program instructions, encoded with the data, or the like.

Data processed by Geometry Processor 130 and program instructions are passed from Geometry Processor 130 to a Rasterizer 150. Rasterizer 150 is a sampling unit that processes graphics primitives and generates sub-primitive data, e.g., fragment data, including coverage data. Coverage data indicates which sub-pixel sample positions within a pixel are "covered" by a fragment formed by the intersection of a pixel and a primitive. Graphics primitives include geometry data, such as points, lines, triangles, quadrilaterals, meshes, surfaces, and the like. Rasterizer 150 converts graphics primitives into sub-primitive data, performing scan conversion on the data processed by Geometry Processor 130. Rasterizer 150 outputs fragment data and fragment program instructions to Fragment Processing Pipeline 160. Therefore the fragment programs configure Fragment Processing Pipeline 160 to operate on fragment data.

The fragment programs configure the Fragment Processing Pipeline 160 to process fragment data by specifying computations and computation precision. A Fragment Shader 155 optionally is configured by fragment program instructions such that fragment data processing operations are performed in multiple passes within Fragment Shader 155. Fragment Shader 155 outputs processed fragment data and codewords generated from fragment program instructions to Raster Operation Unit 165. Raster Operation Unit 165 includes a read interface and a write interface to Memory Controller 120 through which Raster Operation Unit 165 accesses data stored in one or more output buffers in Local Memory 140 or Host Memory 112. Raster Operation Unit 165 optionally performs near and far plane clipping and raster operations, such as stencil, z test, blending, and the like, using fragment data read from the one or more buffers in Local Memory 140 or Host Memory 112 at the x,y position associated with the fragment data and the processed fragment data to produce output data. The output data from Raster Operation Unit 165 is written back to an output buffer in Local Memory 140 or Host Memory 112 at the x,y position within the output buffer associated with the output data. Alternatively, the position is represented as a pair of coordinates other than x,y, e.g., (s,t), (u,v), and the like.

In various embodiments Memory Controller 120, Local Memory 140, and Geometry Processor 130 are configured such that data generated at various points along Graphics Processing Pipeline 103 may be output via Raster Operation Unit 165 and provided to Geometry Processor 130 or Fragment Shader 155 as input. The output data is represented in one or more formats as specified by the codewords. For example, color data may be written as 16, 32, 64, or 128-bit per pixel fixed or floating-point RGBA (red, green, blue, and alpha) to be scanned out for display. Specifically, four 16-bit floating-point components (RGBA) are combined forming 64 bits of color data for each fragment. The output data, e.g., color, depth, and other parameters, may be processed according to a fragment program and stored in one or more output buffers in graphics memory to be used as texture maps, e.g., shadow map, height field, stencil, displacement maps, and the like, by a fragment program. Alternatively, color and depth output data may be written to an output buffer, and later read and processed by Raster Operation Unit 165 to generate the final pixel data prior to being scanned out for display via Output Controller 180. The graphics data processed by Geometry Processor 130, Rasterizer 150, or Fragment Shader 155 of Graphics Processing Pipeline 103 can be primitive data, surface data, pixel data, vertex data, fragment data, or the like. For simplicity, portions of this description will use the term "sample" to refer to primitive data, surface data, pixel data, vertex data, fragment data, or the like.

When processing is completed, an Output 185 of Graphics Subsystem 107 is provided using Output Controller 180. Alternatively, Host Processor 114 reads the composited frame, e.g., output buffer, stored in Local Memory 140 through Memory Controller 120, Graphics Interface 117 and System Interface 115. Output Controller 180 is optionally configured by opcodes, received from Graphics Processing Pipeline 103 via Memory Controller 120, to deliver data to a display device, network, electronic control system, other Computing System 100, other Graphics Subsystem 110, or the like.

Figure 2A:
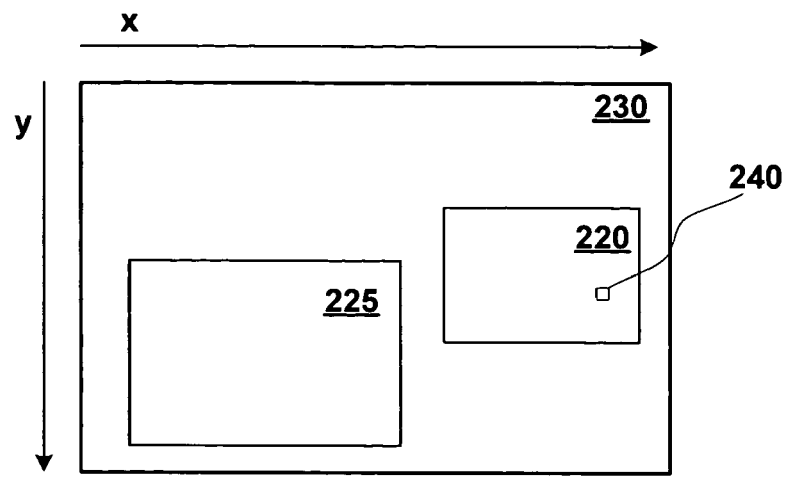
FIG. 2A is a conceptual diagram of an output buffer used by a display device.

FIG. 2A is a conceptual diagram of an Output Buffer 220 and an Output Buffer 225 displayed by a display device, e.g., monitor, projector, and the like. One or more output buffers may be selected for display by designating the one or more output buffers for display using a fragment program. An output buffer may also be selected for display using a conventional method of an application designating an output buffer as the front color buffer. Data stored in Output Buffer 220 and data stored in Output Buffer 225 are displayed on Display 230. Additional buffers of arbitrary sizes may be displayed on Display 230. Each output buffer may be positioned for display relative to Display 230. In one embodiment the position is represented as a pair of coordinates, e.g., (x,y), (s,t), (u,v), and the like.

A Sample 240, such as a pixel, within displayed Buffer 220 is associated with an x,y position relative to Display 230. For example, displayed Output Buffer 220 is positioned at an x offset and a y offset relative to the upper left corner of Display 230. The x,y position of Sample 240 relative to upper left corner of Display 230 is determined by combining the x offset and y offset with the x,y position of Sample 240 within displayed Output Buffer 220, e.g., relative to the upper left corner of displayed Output Buffer 220. The x,y position of Sample 240 relative to displayed Output Buffer 220 is consistent regardless of the position of displayed Output Buffer 220 within Display 230. In an alternate embodiment the x,y origin is in the upper left corner of Display 230 and the x,y position of Sample 240 is described relative to the x,y origin. In this embodiment the x,y position of Sample 240 changes as the position of displayed Output Buffer 220 within Display 230 changes.

Figure 2B:
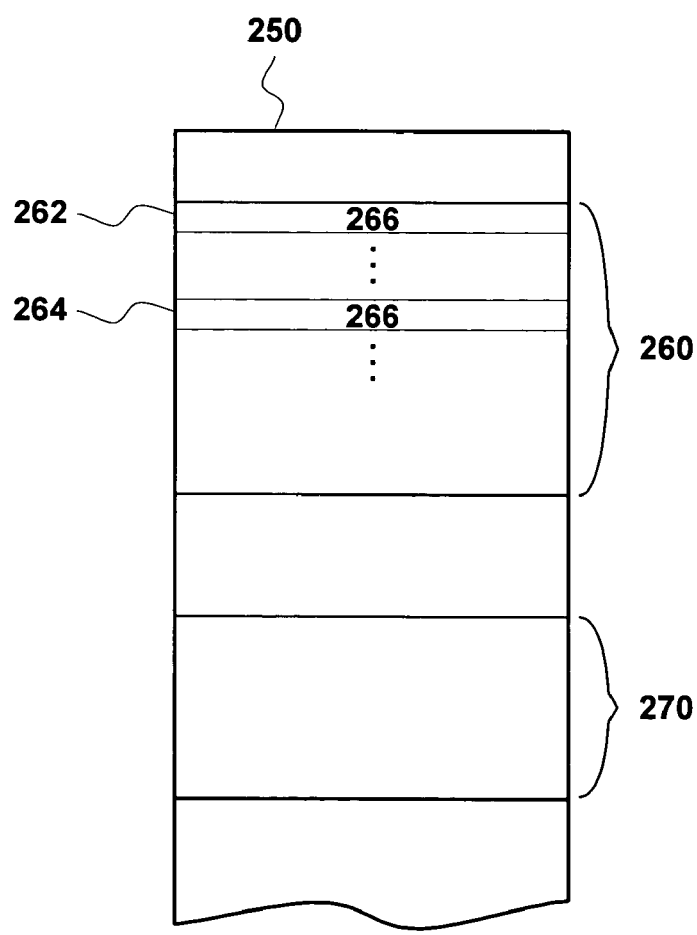
FIG. 2B is a conceptual diagram of output buffers stored in graphics memory.

FIG. 2B illustrates a Portion of Graphics Memory 250 including memory locations storing data for Output Buffer 220. Memory locations within Section 260 store data for Output Buffer 220. For example, a Memory Location 266 stores data associated with Sample 240, e.g., color, depth, stencil, shadow depth, map data, and the like. Each sample produced by Programmable Graphics Processor 105 uses a predefined amount of memory space for storing sample data. A size of Section 260 is equal to the number of Memory Locations 266 contained in Section 260 multiplied by the size of a Memory Location 266. The size of a Memory Location 266 can be any number of bits as specified in hardware or software. An output buffer may include data represented in an 8-bit fixed-point format, a 16-bit fixed-point format, a 16-bit floating-point format, a 32-bit floating-point format, and the like. The number of memory locations contained in a section can vary for each output buffer.

A Memory Location Address 264 is used to access Memory Location 266. Memory Location Address 264 may be computed based on an x,y position within Output Buffer 220 and a base memory space address, Memory Location Address 262, corresponding to a first location within Section 260. In an alternate embodiment Memory Location Address 264 is computed based on an x,y position within Display 230, an x offset of displayed Output Buffer 220, a y offset of displayed Output Buffer 220, and Memory Location Address 262. Output Buffer 220 is also associated with a unique output buffer identifier to differentiate it from other output buffers.

A Section 270 includes memory locations storing data for another output buffer. Section 270 has a base memory space address. Each output buffer is associated with a unique output buffer identifier which may be used to determine the output buffer's corresponding base memory space address. For example a lookup table containing the base memory space address accessed using an output buffer identifier may be stored in Graphics Processing Pipeline 103.

Figure 2C:
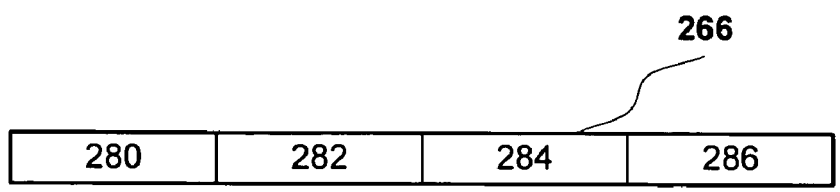
FIGS. 2C and 2D are conceptual diagrams of graphics data storage within a memory location in accordance with one or more aspects of the present invention.

FIG. 2C is a conceptual diagram of graphics data storage, including data represented in varying formats within Memory Location 266. In FIG. 2C Memory Location 266 includes four thirty-two-bit values, Value 280, Value 282, Value 284, and Value 286. Each of the thirty-two-bit values may be represented in either a fixed-point format or in a floating-point format.

Figure 2D:

FIG. 2D is another conceptual diagram of graphics data storage, including data represented in varying formats within Memory Location 266. In FIG. 2D Memory Location 266 includes two values, Value 290 and Value 292. Value 292 is represented in a 64-bit floating-point format. Value 290 includes an 8-bit value represented in a fixed-point format. In one embodiment, Value 290 is an index, for example a shader identifier (ID) used as an index into a table storing material qualities affecting shading. In an alternate embodiment the index may be a pointer to a fragment program for processing one or more fragments. Value 292 is a depth value represented in either a floating-point or fixed-point format. In some embodiments, Memory Location 266 includes values such as light parameters, e.g., a normal vector, half angle light vector, light vector, or the like.

Figure 3:
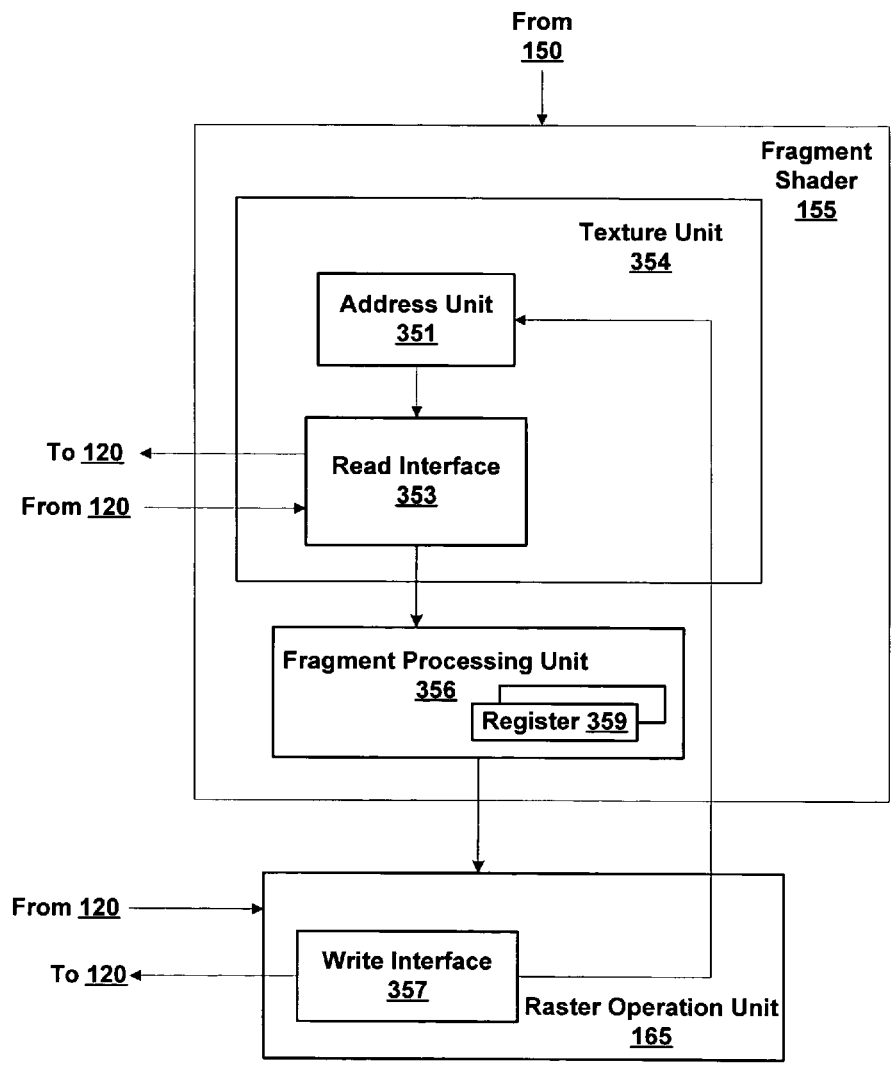
FIG. 3 is a block diagram of an exemplary embodiment of portions of Fragment Processing Pipeline of FIG. 1 in accordance with one or more aspects of the present invention.

FIG. 3 is a block diagram of an exemplary embodiment of portions of Fragment Processing Pipeline 160 in accordance with one or more aspects of the present invention. Fragment Shader 155, including Texture Unit 354, receives fragment data and fragment program instructions from Rasterizer 150. The fragment data is processed according to the fragment program instructions. A fragment program instruction may be used to determine a buffer identifier of an output buffer to write processed data to, i.e., a destination buffer. For example fragments within a surface are separated, each being selectively written to one of two output buffers based on a procedurally computed function. One of the two output buffers may be selected for writing for each fragment. Conventionally, the output buffer is predetermined for all of the fragments within a plurality of primitives such that a destination buffer may not be selected for each fragment or for the fragments within a primitive.

An Address Unit 351 receives a position associated with a sample and an output buffer identifier and determines a read address to read source data from. A Shader Read Interface 353 receives the read address from Address Unit 351 and also receives the processed fragment data and the fragment program instructions from another unit (not shown) within Texture Unit 354. Shader Read Interface 353 reads additional fragment program instructions and output buffer data (depth map, light parameters, indices, texture map, height field, bump map, shadow map, jitter values, and the like) from Local Memory 140 or Host Memory 112, via Memory Controller 120. The output buffer data stored in graphics memory may be generated by Programmable Graphics Processor 105, by Host Processor 114, by another device, by a human, or the like.

Memory Controller 120 outputs the output buffer data and the additional fragment program instructions to Shader Read Interface 353. Texture Unit 354 outputs the output buffer data, processed fragment data, and the additional fragment program instructions to a Fragment Processing Unit 356. Fragment Processing Unit 356 processes the output buffer data and processed fragment data as specified by the additional fragment program instructions and stores shaded fragment data, e.g., x, y, color, depth, configuration control, other parameters, in Registers 359 as specified by the fragment program. Fragment Shader 155 produces configuration control using the additional fragment program instructions. Fragment Processing Unit 356 outputs the shaded fragment data from Registers 359 to Raster Operation Unit 165. The shaded fragment data stored in each register in Registers 359 may be written to one or more output buffers via Raster Operation Unit 165.

In some embodiments Fragment Processing Unit 356 is configured to process at least two fragments in parallel. Likewise, Shader Read Interface 353 may also be configured to process at least two fragments in parallel. Raster Operation Unit 165 optionally processes the shaded fragment data according to the configuration control. A Write Interface 357 within Raster Operation Unit 165 writes the optionally processed shaded fragment data to an output buffer stored in Local Memory 140 or Host Memory 112, via Memory Controller 120. When a fragment program includes a flush instruction, Raster Operation Unit 165 outputs a signal to Address Unit 351 indicating that all pending write operations have been completed. The flush instruction is used to avoid read-after-write conflicts when reading from an output buffer. When a flush instruction is received by Address Unit 351, Address Unit 351 does not accept new data until receiving the signal indicating that all pending write operations have been completed from Raster Operation Unit 165.

Figure 4A:
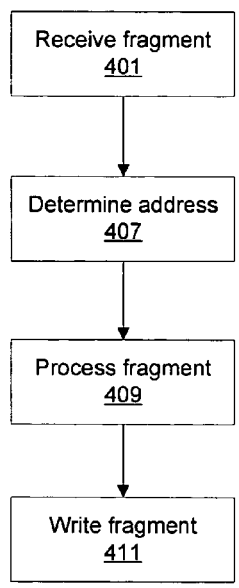
FIGS. 4A and 4B illustrate embodiments of methods in accordance with one or more aspects of the present invention.

FIG. 4A illustrates a method of processing graphics data in accordance with one or more aspects of the present invention. A fragment program specifies writing shaded fragment data to a location in an output buffer. In step 401 a fragment associated with a position is received by Fragment Shader 155. The position corresponds to a location in an output buffer to be written. The output buffer is associated with an output buffer identifier. The output buffer identifier may be predetermined by an application, by a device driver, or by a fragment program.

In step 407 the fragment is shaded by Fragment Processing Unit 356 as specified by a fragment program, producing shaded fragment data. The shaded fragment data and configuration control is output by Fragment Shader 155 to Raster Operation Unit 165. In step 409 Write Interface 357 determines the memory location address to be written. In an alternate embodiment, Address Unit 351 determines the memory location address and outputs it to Write Interface 357 via Fragment Processing Unit 356. In step 411 the shaded fragment data output by Fragment Shader 155 to Raster Operation Unit 165 is written to the location in the destination buffer.

Figure 4B:
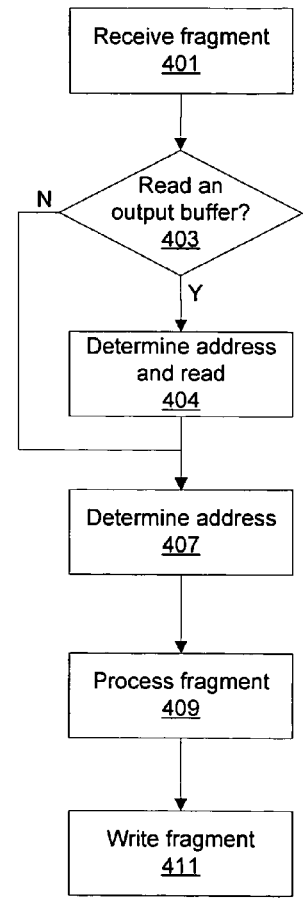

FIG. 4B illustrates a method of processing graphics data including some of the steps shown in FIG. 4A. A fragment program specifies reading data from a location in an output buffer to produce shaded fragment data to be written to the output buffer or another output buffer. In step 401 a fragment is received by Fragment Shader 155. In step 403 Address Unit 351 determines if a read from an output buffer is specified by the fragment program, and, if so, in step 404 Address Unit 351 determines the memory location address to be accessed. In step 404 Address Unit 351 outputs the memory location address corresponding to a location in the output buffer to Shader Read Interface 353. If, in step 403, Address Unit 351 determines a read from an output buffer is not specified by the fragment program Address Unit 351 proceeds to step 407. Steps 407, 409, and 411 proceed as described in relation to FIG. 4A.

Multiple output buffers may be used to improve shading performance by shading only visible fragments in images. In particular, performance may be improved for images with high depth complexity. For example, geometry for a frame may be processed, i.e. fragments may be depth sorted, to produce a depth map for visible fragments. The depth map may be stored as an output buffer prior to shading. Additional processed fragment data, such as lighting parameters, color data, indices, or the like may be stored in additional output buffers. The geometry may be processed again, using the depth map to identify the visible fragments. The visible fragments may then be shaded using the additional processed fragment data read from the additional output buffers.

Figure 5A:
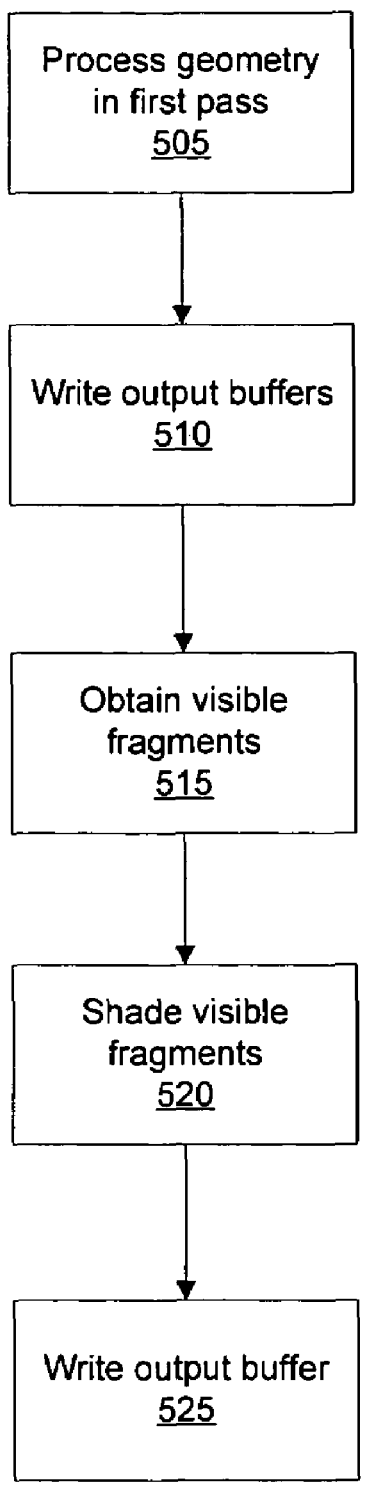
FIGS. 5A and 5B illustrate embodiments of methods of processing graphics data using deferred shading in accordance with one or more aspects of the present invention.

FIG. 5A illustrates an embodiment of a method of processing graphics data using deferred shading in accordance with one or more aspects of the present invention. In step 505 geometry, e.g., graphics primitives, is processed by Geometry Processor 130 and Rasterizer 150 to produce processed fragment data, including depth data. Fragment Processing Pipeline 160 receives the processed fragment data and computes a single depth value for each fragment. Fragment Processing Pipeline 160 then performs depth sorting using a technique known to those skilled in the art. In step 510 Fragment Processing Pipeline 160 stores a depth map for the visible fragments in an output buffer. The depth map includes a single depth value for each pixel. Fragment Processing Pipeline 160 stores a portion of the processed fragment data, such as lighting parameters, indices, or the like, in additional output buffers. After a first pass through Graphics Processing Pipeline 103, the depth map is stored in an output buffer and a portion of the processed fragment data for the visible fragments is stored in one or more additional output buffers.

In step 515 the geometry is processed by Geometry Processor 130 and Rasterizer 150 to produce the processed fragment data, including the depth data. In step 520, the depth map is read from the output buffer and is used to identify the visible fragments. Fragment Processing Pipeline 160 computes a single depth value for each fragment and compares the computed depth value for a fragment to a depth value read from a position in the depth map. The position in the depth map corresponds to the x,y position of the fragment. A fragment whose computed depth value is equal to the corresponding depth value read from the depth map is a visible fragment.

Alternatively, in step 515, a polygon, e.g. quadrilateral, corresponding to the dimensions of the depth buffer is input to and processed by Geometry Processor 130. Rasterizer 150 outputs coverage data associated with x,y positions to Fragment Processing Pipeline 160. Fragment Processing Pipeline 160 reads a depth value for each x,y position from the depth map. Likewise, processed fragment data for each x,y position is read from the one or more additional output buffers. The processed fragment data read from the one or more additional output buffers and the depth values buffers for the x,y positions represent the visible fragments.

In step 520, the visible fragments are shaded using the portion of the processed fragment data read from the additional output buffers. Non-visible fragments are culled prior to shading. Therefore texture mapping and other shading operations are not performed on non-visible fragments resulting in improved shading performance. In some embodiments, non-opaque geometry is processed in step 515 to produce non-opaque fragments. In step 520 the non-opaque fragments are shaded and blended with the visible fragments dependent on the depth map using techniques known to those skilled in the art.

In step 525 Fragment Processing Pipeline 160 stores pixel color values in at least one output buffer for display, output, or further processing. In some embodiments, Fragment Processing Pipeline 160 may store additional pixel data in other output buffers.

Figure 5B:
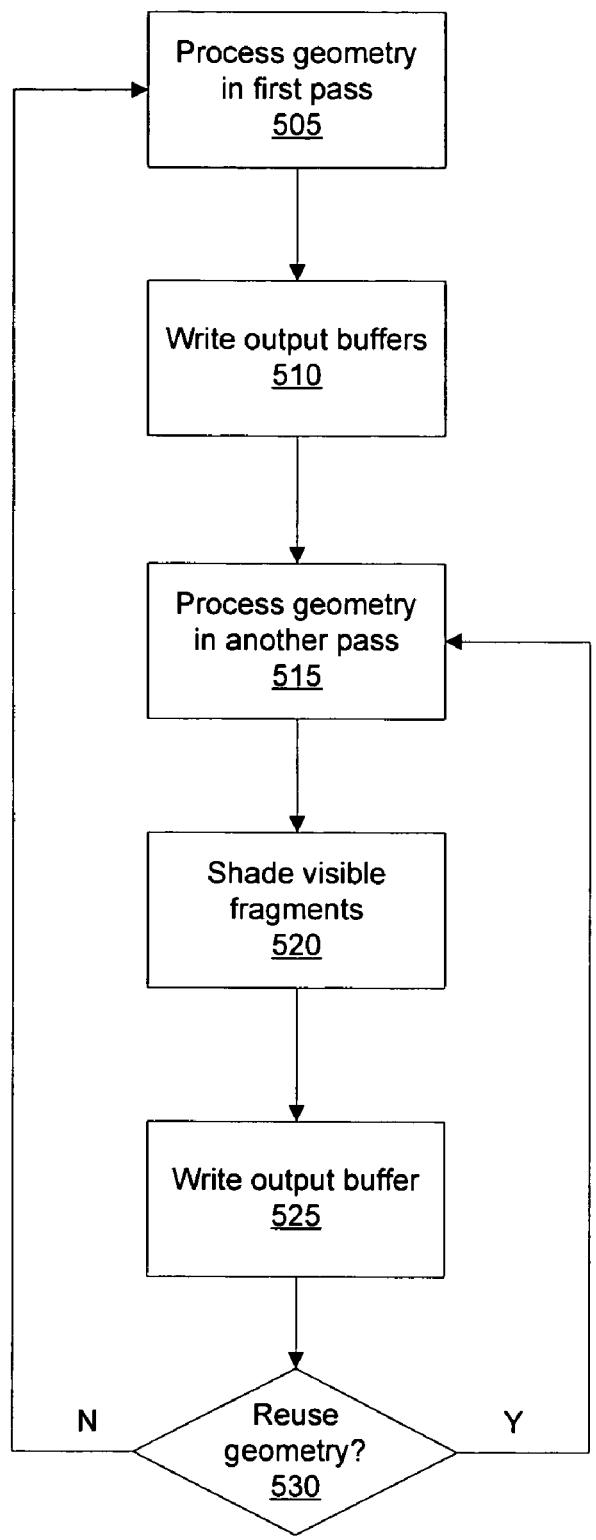

FIG. 5B illustrates a method of processing graphics data including some of the steps shown in FIG. 5A. Steps 505, 510, 515, 520, and 525 are completed as described in relation to FIG. 5A. In step 530 an application program determines if the geometry processed in step 505 will be used to produce an additional image, and, if so, steps 515, 520, 525 and 530 are repeated to produce the additional image. Therefore, the depth map is used to produce two or more images, resulting in further shading performance improvement compared with producing the two or more images without using deferred shading. If, in step 530 the application program determines the geometry processed in step 505 will not be used to produce an additional image, then Programmable Graphics Processor 105 returns to step 505.

Using multiple output buffers to perform deferred shading as described in relation to FIGS. 5A and 5B reduces shading computations for non-visible fragments and reduces texture memory read accesses because non-visible fragments are not shaded. Furthermore, the number of memory read and write accesses needed by Raster Operation Unit 165 for depth sorting is not increased when deferred shading is used.

Figure 5C:
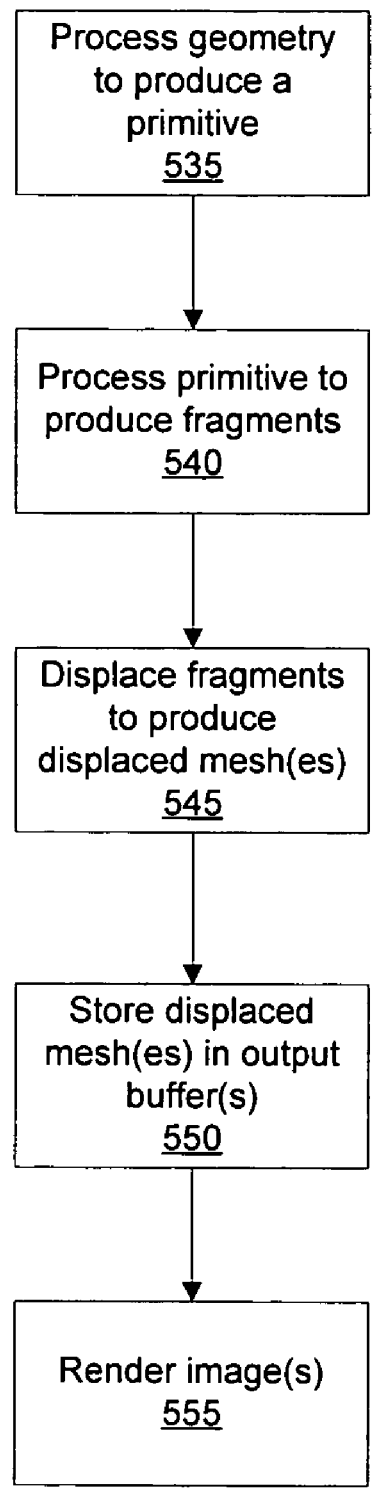
FIG. 5C illustrates an embodiment of a method of processing graphics data in accordance with one or more aspects of the present invention.

FIG. 5C illustrates an embodiment of a method of processing graphics data to produce displaced meshes in accordance with one or more aspects of the present invention. A mesh of vertices may be produced by Graphics Processing Pipeline 103 by rendering a primitive (quadrilateral or triangle) where each fragment generated during processing of the primitive is used as a vertex when the generated fragments are read back into the Geometry Processor 130 to render an image. Each fragment, before being used as a vertex, may be displaced to produce one or more displaced meshes. Each displaced mesh is stored in an output buffer and may be used as a vertex array to animate geometry associated with a character over several images, e.g., frames.

In step 535, graphics data is processed by Geometry Processor 130 to produce a primitive. In step 540, the primitive is processed by Rasterizer 150 to produce fragments. The fragments are output by Rasterizer 150 to Fragment Processing Pipeline 160, and, in step 545 Fragment Processing Pipeline 160 produces processed fragment data by displacing, along a normal vector, the coordinates of the fragment to produce one or more displaced meshes. In step 550, the displaced meshes are stored in output buffers. In step 555 the one or more displaced meshes are read by Graphics Processing Pipeline 103 from one or more output buffers during a subsequent geometry pass and interpreted as a vertex array for rendering one or more images.

In one embodiment, each displaced mesh may correspond to a displacement for application to geometry associated with a particular character for a single image. In step 555, Geometry Processor 130 processes graphics data, including the geometry associated with a character. One of the displaced meshes stored in an output buffer is used as the geometry to render an image, thereby defining the geometry associated with the character. Step 555 may be repeated using another displaced mesh to provide the positions of the vertices defining the geometry associated with the character for inclusion in the same image or another image.

Figure 6A:
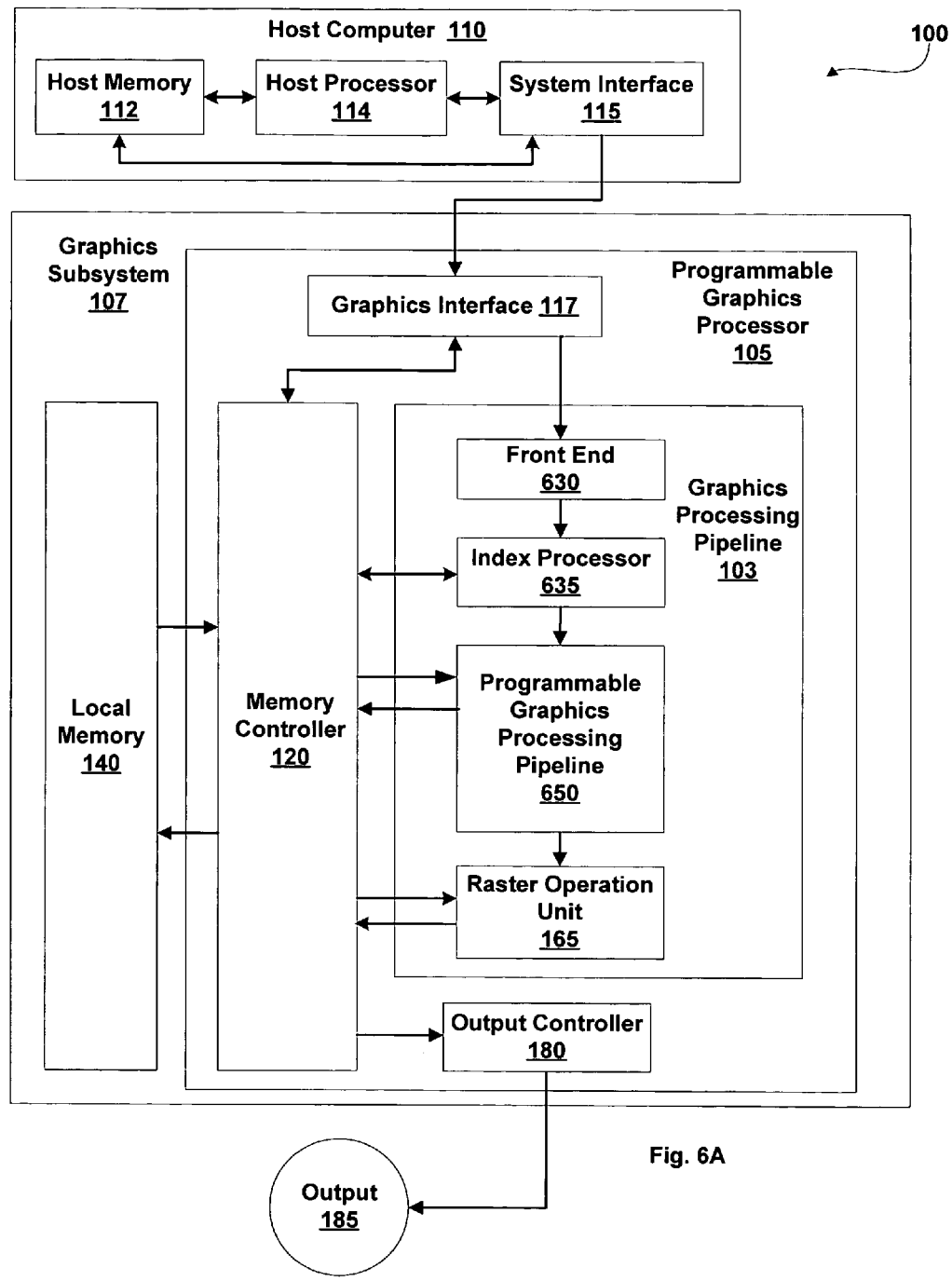
FIG. 6A is a block diagram of an exemplary embodiment of a respective computer system in accordance with one or more aspects of the present invention including a host computer and a graphics subsystem.

FIG. 6A is an alternate embodiment of Computing System 100 in accordance with one or more aspects of the present invention. In this embodiment Programmable Graphics Processor 105 includes, among other components, Front End 630 that receives commands from Host Computer 110 via Graphics Interface 117. Front End 630 interprets and formats the commands and outputs the formatted commands and data to an Index Processor 635. Some of the formatted commands are used by a Programmable Graphics Processing Pipeline 650 to initiate processing of data by providing the location of program instructions or graphics data stored in memory. Index Processor 635, Programmable Graphics Processing Pipeline 650 and Raster Operation Unit 165 each include an interface to Memory Controller 120 through which program instructions and data may be read from graphics memory.

Index Processor 635 optionally reads processed data, e.g., data written by Raster Operation Unit 165, from graphics memory and outputs the data, processed data and formatted commands to Programmable Graphics Processing Pipeline 650. Programmable Graphics Processing Pipeline 650 and Raster Operation Unit 165 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, and the like. Programmable Graphics Processing Pipeline 650 and Raster Operation Unit 165 are each optionally configured such that data processing operations are performed in multiple passes through those units or in multiple passes within Programmable Graphics Processing Pipeline 650.

In one embodiment Programmable Graphics Processing Pipeline 650 performs geometry computations, rasterization, and pixel computations. Therefore, Programmable Graphics Processing Pipeline 650 is programmed to operate on surface, primitive, vertex, fragment, pixel, sample, or any other data.

Figure 6B:
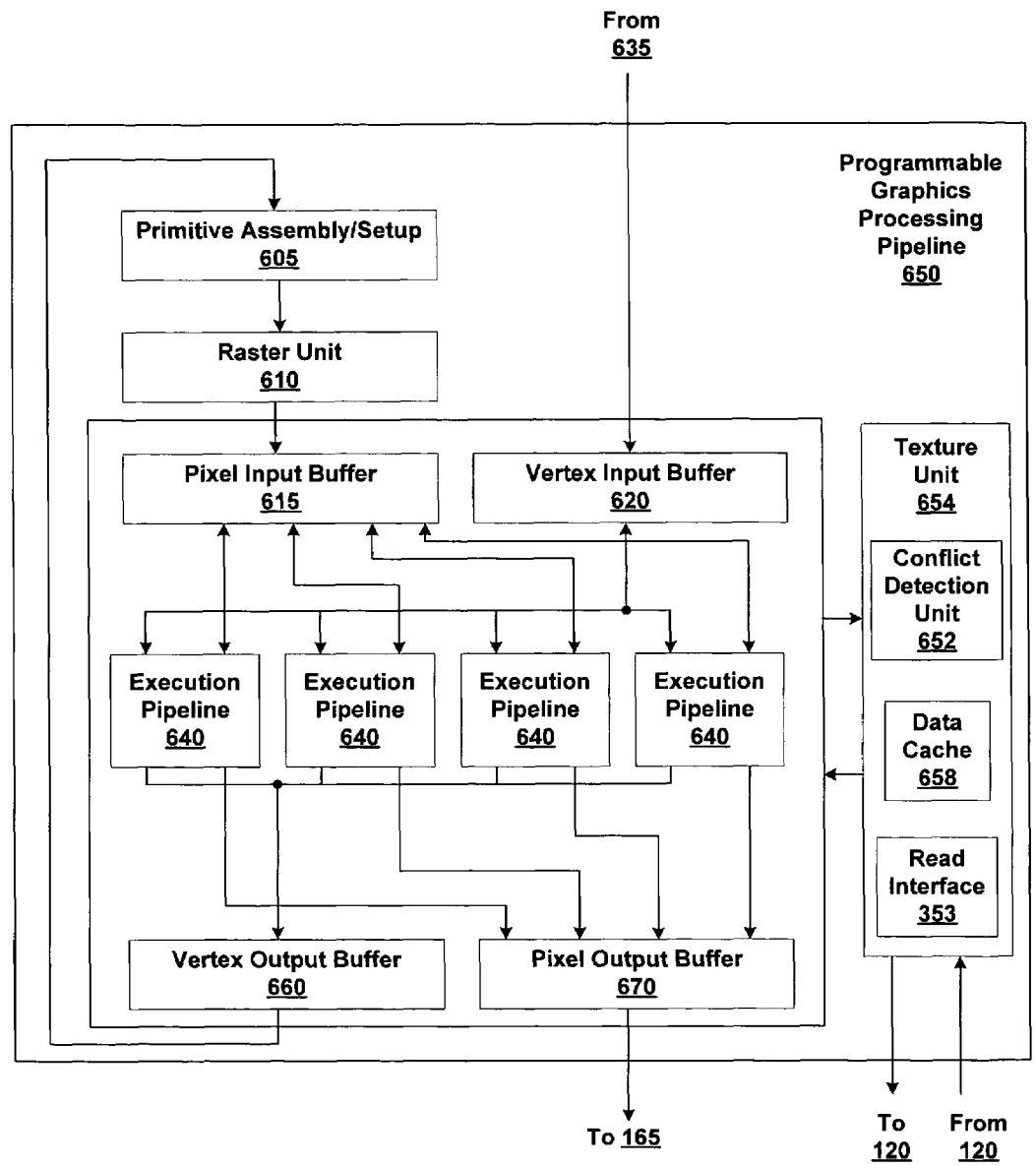
FIG. 6B is a block diagram of an exemplary embodiment of Programmable Graphics Processing Pipeline of FIG. 6A in accordance with one or more aspects of the present invention.

FIG. 6B is a block diagram of an exemplary embodiment of Programmable Graphics Processing Pipeline 650 in accordance with one or more aspects of the present invention. Samples, such as surfaces, primitives, or the like, are received from Index Processor 635 by Programmable Graphics Processing Pipeline 650 and stored in a Vertex Input Buffer 620 in a register file, FIFO (first in first out) memory, cache, or the like (not shown). The samples are broadcast to Execution Pipelines 640, four of which are shown in FIG. 6B. An alternate embodiment may include either more or fewer Execution Pipelines 640. Each Execution Pipeline 640 includes at least one multithreaded processing unit. The samples output by Vertex Input Buffer 620 may be processed by any one of the Execution Pipelines 640. A sample is accepted by an Execution Pipeline 640 when a processing thread within the Execution Pipeline 640 is available.

Execution Pipelines 640 may receive first samples, such as higher-order surface data, and tessellate the first samples to generate second samples, such as vertices. Execution Pipelines 640 may be configured to transform the second samples from an object-based coordinate representation (object space) to an alternatively based coordinate system such as world space or normalized device coordinates (NDC) space. Each Execution Pipeline 640 communicates with Texture Unit 654 using Read Interface 353 to graphics data stored in buffers in graphics memory via Memory Controller 120. An optional Data Cache 658 within Texture Unit 654 is used to improve memory read performance by reducing read latency. In another alternate embodiment, a Texture Unit 654 is included in each Execution Pipeline 640. In some embodiments, program instructions are stored within Programmable Graphics Processing Pipeline 650. In some embodiments, program instructions are read from memory by each Execution Pipeline 640 via Memory Controller 120.

Execution Pipelines 640 output processed samples, such as vertices, that are stored in a Vertex Buffer Input 660 in a register file, FIFO memory, cache, or the like (not shown). Processed vertices output by Vertex Input Buffer 660 are received by a Primitive Assembly/Setup 605. Primitive Assembly/Setup 605 calculates parameters, such as deltas and slopes, for rasterizing the processed vertices. Primitive Assembly/Setup 605 outputs parameters and samples, such as vertices, to Raster Unit 610. The Raster Unit 610 performs scan conversion on samples and outputs fragments to a Pixel Input Buffer 615.

A graphics program (vertex program or fragment program) is executed within one or more Execution Pipelines 640 as a plurality of threads where each vertex or fragment to be processed by the program is assigned to a thread. Although threads share processing resources within Programmable Graphics Processing Pipeline 650 and graphics memory, the execution of each thread proceeds in the one or more Execution Pipelines 640 independent of any other threads. A RAW position conflict may exist when a fragment program specifies to write to a position in a buffer that the fragment program later specifies to read from. Likewise, a RAW position conflict may exist when a fragment program specifies to write to a position in a buffer that a subsequent fragment program specifies to read from. Furthermore, because threads are executed independently, RAW conflicts may exist when a thread executes a write to a position in a buffer that the thread or another thread executes a read from.

In order to eliminate the need to track RAW conflicts between two or more Execution Pipelines 640, each Execution Pipeline 640 is configured to process fragments for at least one specific destination location. For example, an Execution Pipeline 640 is configured to process fragments corresponding to any destination location within a contiguous region, e.g. (x,y) position, scanline, tile, or the like. In another example, an Execution Pipeline 1040 is configured to process fragments corresponding to any destination location modulo n vertically and modulo m horizontally, e.g., one (x,y) position in each tile, every mth (x,y) position in a scanline, and the like. Texture Unit 654 includes Conflict Detection Unit 652 to track pending destination write operations in order to detect and avoid RAW position conflicts. Alternatively, each Execution Pipeline 640 includes a Conflict Detection Unit 652. Furthermore, if execution of a thread is blocked because of a RAW position conflict, some embodiments may permit execution of one or more other threads that do not have position conflicts, thereby improving throughput.

Pixel Input Buffer 615 receives fragments from Raster Unit 610 and outputs the fragments to each Execution Pipeline 640. The fragments, output by Pixel Input Buffer 615, are each processed (as in Fragment Processing Unit 156) by only one of the Execution Pipelines 640. Pixel Input Buffer 615 determines which one of the Execution Pipelines 640 to output each fragment to depending on a position, e.g., (x,y), associated with each sample. In this manner, each fragment is output to the Execution Pipeline 640 designated to process fragments associated with the position.

Each Execution Pipeline 640 signals to Pixel Input Buffer 615 when a fragment can be accepted or when a fragment cannot be accepted. Fragment program instructions associated with a thread configure at least one multithreaded processing unit within an Execution Pipeline 640 to perform operations such as texture mapping, shading, blending, and the like. Processed fragments are output from each Execution Pipeline 640 to a Pixel Output Buffer 670. Pixel Output Buffer 670 optionally stores the processed samples in a register file, FIFO, cache, or the like (not shown). The processed samples are output from Pixel Output Buffer 670 to Raster Operation Unit 165.

Execution Pipelines 640 are optionally configured using program instructions read by Texture Unit 654 such that data processing operations are performed in multiple passes through at least one multithreaded processing unit within Execution Pipelines 640. In other embodiments, each Execution Pipeline 640 may process fragments associated with any position. Each fragment output by Pixel Input Buffer 615 is processed by an available Execution Pipeline 640. Conflict Detection Unit 652 is included in Pixel Input Buffer 615 instead of in either Texture Unit 654 or each Execution Pipeline 640.

FIG. 7A illustrates an embodiment of a method of generating shadow maps, each shadow map stored in a shadow (output) buffer corresponding to a light source, in accordance with one or more aspects of the present invention. Although the method steps are described in the context of the systems illustrated in FIGS. 6A and 6B, any system configured to perform the method steps in any order is within the scope of the invention. Execution Pipeline 640 is configured by fragment program instructions to render a scene from the viewpoint of each light to produce a corresponding shadow map. The shadow map corresponding to a light includes shadow depth values of the shadow volume surface nearest to the light. Each shadow map is stored in an output buffer with an associated output buffer identifier.

In step 701 Execution Pipeline 640 processes geometry for an image using a vertex program producing primitives in NDC space. The primitives in NDC space are optionally stored in an output buffer for reuse. In step 703 Execution Pipeline transforms the primitives in NDC space to a first light's viewpoint and the primitives are processed using a fragment program to generate a shadow map corresponding to the first light, thereby determining position coordinates for shadow depth values in the shadow map. In step 705 the shadow map corresponding to the first light is stored in a first shadow buffer.

In step 707 Programmable Graphics Processing Pipeline 650 determines if another light will be processed, and, if so, repeats steps 703 and 705 storing a another shadow buffer corresponding to a another light. Steps 707, 703, and 705 are repeated for each additional light, resulting in additional shadow buffers. If, in step 707 Programmable Graphics Processing Pipeline 650 determines another light will not be processed, then, in step 709 Programmable Graphics Processing Pipeline 650 renders the image as described in relation to FIG. 7B.

Each shadow buffer is associated with a light viewpoint and a single geometry pass through Execution Pipelines 640 may be used to produce primitives that are rendered to generate a shadow buffer for each light source. An output buffer generated during the single geometry pass stores the primitives in NDC space. The output buffer is read and transformed by Execution Pipelines 640 to produce transformed primitive data for each light source. Shadow maps are generated by Programmable Graphics Processing Pipeline 650 and stored in additional output buffers in a single pass through Programmable Graphics Processing Pipeline 650.

FIG. 7B illustrates an embodiment of a method of generating an image using shadow maps in accordance with one or more aspects of the present invention. Although the method steps are described in the context of the systems illustrated in FIGS. 6A and 6B, any system configured to perform the method steps in any order is within the scope of the invention. In step 710 Execution Pipelines 640 read the primitives in NDC space from an output buffer, transforms the primitives, producing transformed vertex data in eye space. Alternatively, Execution Pipelines 640 process geometry for the image using a vertex program producing transformed vertex data in eye space. Primitive Assembly/Setup 605 receives the transformed vertex data from the Execution Pipeline 640 via Vertex Output Buffer 660, and Raster Unit 610 produces fragment data that is output to Pixel Input Buffer 615. In step 711 an Execution Pipeline 640 is configured by a fragment program to compute the fragment depth value of a fragment for a position. In step 713 Texture Unit 654 reads a shadow map depth value from a shadow buffer for the position. In step 715 Texture Unit 654 outputs the shadow map depth value and the fragment depth value to the Execution Pipeline 640. The Execution Pipeline 640 is configured by the fragment program to determine if the fragment depth value is in front of or behind the shadow map depth value. If, in step 715 the Execution Pipeline 640 determines the fragment depth value is behind the shadow map depth value, i.e. the fragment is in shadow, in step 719 the Execution Pipeline 640 updates a shadow state associated with the fragment. The shadow state is optionally used during shading to modify or compute the color of the fragment.

In step 721 the Execution Pipeline 640 determines if the fragment program specifies to read another shadow buffer corresponding to another light source, and, if so, the Execution Pipeline 640 repeats steps 713, 705, and possibly step 719 for each light source. If, in step 721 the Execution Pipeline 640 determines the fragment program does not specify to read another shadow buffer, in step 715 the Execution Pipeline 640 is configured by the fragment program to shade the fragment using the computed fragment color and the shadow state to produce a shaded fragment color.

In step 727 the Execution Pipeline 640 reads a color value from an output buffer, such as a color buffer, for the position associated with the fragment. In step 727 the Execution Pipeline 640 also reads a depth value from an output buffer, such as a depth buffer, for the position associated with the fragment. In an alternate embodiment the color values and the depth values are stored in one output buffer. In step 729 the Execution Pipeline 640 is configured by the fragment program to perform a depth compare operation using the fragment depth value and the depth value. In step 731, the Execution Pipeline 640 determines if the fragment passed the depth compare operation, and, if so, in step 733 the Execution Pipeline 640 writes the fragment depth to the depth buffer in the memory location corresponding to the position associated with the fragment. In step 733 the Execution Pipeline 640 also optionally computes a blended color using the color value and the shaded fragment color and writes either the blended color or the shaded fragment color to the color buffer in the memory location corresponding to the position associated with the fragment. If, in step 731 the Execution Pipeline 640 determines the fragment did not pass the depth compare operation Fragment Shader 155 proceeds to step 735. In an alternative embodiment, steps 727, 729, 731, and 733 are completed by Raster Operation Unit 165 which receives the fragment via Pixel Output Buffer 670.

In step 735 Execution Pipeline 640 determines if another fragment will be processed, and, if so, returns to step 711. If, in step 735 Execution Pipeline 640 determines another fragment will not be processed, in step 737 Output Controller 180 reads the color buffer for output to Output 185, such as a display or the like. In an alternate embodiment, the color buffer is output via either Graphics Interface 117 or Output Controller 180 to a film recording device or written to a peripheral device, e.g., disk drive, tape, compact disk, or the like.

FIG. 7C illustrates an embodiment of a method of generating an image using shadow maps, including the steps described in conjunction with FIG. 7B, in accordance with one or more aspects of the present invention. In this embodiment, steps 729 and 731 are completed between steps 711 and 713, thereby avoiding shading of fragments which are culled by the depth comparison performed in step 731. Steps 710 and 711 are completed as previously described in conjunction with FIG. 7B. In step 729 the Execution Pipeline 640 is configured by the fragment program to perform a depth compare operation using the fragment depth value and the depth value. In step 731, when a fragment fails the depth compare operation Fragment Shader 155 proceeds to step 735. Otherwise, Fragment Shader 155 proceeds to step 713 and completes steps 713, 715, 719, 721, 725, 727, 733, 735, and 737 as previously described in conjunction with FIG. 7B.

FIG. 8A illustrates an embodiment of a method of depth peeling in accordance with one or more aspects of the present invention. Although the method steps are described in the context of the systems illustrated in FIGS. 6A and 6B, any system configured to perform the method steps in any order is within the scope of the invention. Depth peeling is a method of rendering an image without sorting (by depth) the fragments prior to rendering. Each fragment within an image is processed by Execution Pipeline 640 to determine the front-most depth value and color for each position within the image. The front-most depth value and color are stored in either a first buffer containing depth and color or in two buffers, one containing color (a first color buffer) and one containing depth (a first depth buffer). Each fragment is optionally processed by Execution Pipeline 640 during a number of additional passes through Programmable Graphics Processing Pipeline 650, respectively. Each additional pass determines the "next" front-most fragment layer in the image, storing depths of the next front-most layer in a second depth buffer and storing colors of the next front-most layer in a second color buffer. For the purpose of order-independent transparency rendering, the each next front-most layer is blended with the front-most layer(s) at the end of each additional pass. In an alternative embodiment, the second color buffer stores colors of the next front-most layer blended with the front-most colors.

At the end of the first additional pass through Programmable Graphics Processing Pipeline 650 the second color buffer contains the image color for the blended colors of the first two transparent layers of fragments. A second additional pass through Programmable Graphics Processing Pipeline 650 may be completed, storing a next front-most depth in the first depth buffer and a blended color for the first three layers of fragments in the first color buffer. Likewise, further additional passes through Programmable Graphics Processing Pipeline 650 may be completed either reading from the first depth and color buffers and writing to the second depth and color buffers or reading from the second depth and color buffers and writing to the first depth and color buffers. During depth peeling Conflict Detection Unit 652 improves fragment processing throughput so that Fragment Processing Pipeline 160 or Execution Pipelines 650 do not need to be flushed between each geometry pass or processing pass through Programmable Graphics Processor 105 to avoid position conflicts.

In step 801 an Execution Pipeline 640 is configured by fragment program instructions to compute the fragment depth value of a fragment for a position. In step 803 Texture Unit 654 reads a depth buffer value for the position. Conflict Detection Unit 652 detects any position conflicts and the read is not performed until any detected position conflicts are resolved. In step 805 Texture Unit 654 outputs the depth buffer value and the fragment depth value to the Execution Pipeline 640. Execution Pipeline 640 is configured by the fragment program instructions to determine if the fragment depth value will be written to the depth buffer. For example, in one embodiment, the fragment will be written to the depth buffer when the fragment depth value is nearer to the viewpoint than the depth buffer value at the position. If, in step 805 the Execution Pipeline 640 determines the fragment depth value will be written to the depth buffer in step 814 the Execution Pipeline 640 is configured by the fragment program instructions to produce a shaded fragment color. In step 821 Write Interface 157 within Raster Operation Unit 165 writes the shaded fragment color and the fragment depth value to the first color buffer and the first depth buffer respectively.

In step 823 the Execution Pipeline 640 determines if another fragment will be processed, and, if so, returns to step 801. In step 801 an Execution Pipeline 640 is configured by fragment program instructions to compute the fragment depth value of another fragment for another position. In step 803 Texture Unit 654 reads a depth buffer value for the other position. In step 805, the Execution Pipeline 640 receives the depth buffer value read in step 803 and the fragment depth value computed in step 801. The Execution Pipeline 640 is configured by the fragment program instructions to determine if the fragment depth value will be written to the first depth buffer. If, in step 805 the Execution Pipeline 640 determines the fragment depth value will not be written to the first depth buffer, then in step 823 the Execution Pipeline 640 determines if another fragment will be processed, and, if so the Execution Pipeline 640 returns to step 801. If, in step 823, the Execution Pipeline 640 determines another fragment will not be processed, then in step 825, the Execution Pipeline 640 determines if this is the first pass through Graphics Processing Pipeline 103. If, in step 825, Execution Pipeline 640 determines this is the first pass through Graphics Processing Pipeline 103, then in step 829, Graphics Processing Pipeline 103 determines if another pass through Graphics Processing Pipeline 103, the first additional pass, will be completed to determine the next front-most fragment layer within the image. If, in step 829, Graphics Processing Pipeline 103 determines another pass will be completed, the Execution Pipeline 640 returns to step 801. Prior to starting the first additional pass, the second depth buffer is initialized to the furthest depth value to determine the next front-most fragment layer which lies between the front-most layer and the furthest depth value.

In step 801 an Execution Pipeline 640 is configured by fragment program instructions to compute the fragment depth value of a fragment for a position. In step 803 Texture Unit 654 reads depth buffer values for the position from the first depth buffer and the second depth buffer. The read of the second depth buffer (the first depth buffer is read-only for this pass) is performed using Conflict Detection Unit 652 to detect and avoid any position conflicts.

In step 805, the Execution Pipeline 640 receives the front-most depth buffer value read from the first depth buffer in step 803, the next front-most depth buffer value read from the second depth buffer in step 803, and the fragment depth value computed in step 801. The Execution Pipeline 640 is configured by the fragment program instructions to determine if the fragment depth value will be written to the depth buffer. For example, the fragment will be written to the depth buffer when the fragment depth value is nearer to the viewpoint than the next front-most depth buffer value at the position and further from the viewpoint than the front-most depth buffer value at the position. If, in step 805, the Execution Pipeline 640 determines the fragment depth value will be written to the second depth buffer, then in step 814, the Execution Pipeline 640 is configured by the fragment program instructions to produce a shaded fragment color.

In step 821 the shaded fragment color and fragment depth value are output by the Execution Pipeline 640 to Raster Operation Unit 165 (via Pixel Output Buffer 670) and Raster Operation Unit 165 writes the shaded fragment color and fragment depth value to the second color buffer and the second depth buffer, respectively. In an alternative embodiment, in step 821, Raster Operation Unit 165 reads a color from the first color buffer for the position and Raster Operation Unit 165 is configured by the fragment program instructions to blend the color read from the first color buffer with the shaded fragment color to produce a blended color. In the alternative embodiment, Write Interface 157 within Raster Operation Unit 165 writes the blended color and the fragment depth value to the second color buffer and the second depth buffer respectively.

In step 823, the Execution Pipeline 640 determines if another fragment will be processed, and, if so, returns to step

801. In step 801, an Execution Pipeline 640 is configured by fragment program instructions to compute the fragment depth value of another fragment for another position. In step 803 Texture Unit 654 reads depth buffer values for the other position from the first depth buffer and the second depth buffer. The read of the second depth buffer (the first depth buffer is read-only for this pass) is performed using Conflict Detection Unit 652 to detect and avoid any position conflicts. In step 805, the Execution Pipeline 640 receives the front-most depth buffer value read from the first depth buffer in step 803, the next front-most depth buffer value read from the second depth buffer in step 803, and the fragment depth value computed in step 801. The Execution Pipeline 640 is configured by the fragment program instructions to determine if the fragment depth value will be written to the depth buffer. If, in step 805, the Execution Pipeline 640 determines the fragment depth value will not be written to the second depth buffer, then in step 823, the Execution Pipeline 640 determines if another fragment will be processed. If, in step 823, the Execution Pipeline 640 determines another fragment will not be processed, then in step 825, the Execution Pipeline 640 determines if this is the first pass through Graphics Processing Pipeline 103.

If, in step 825, the Execution Pipeline 640 determines this is not the first pass through Graphics Processing Pipeline 103, then in step 827, the Execution Pipeline 640 blends the front-most (first) color buffer with the next front-most (second) color buffer and stores the blended color buffers in the second color buffer. In step 829 Graphics Processing Pipeline 103 determines if another pass will be completed to process the next front-most layer of fragments in the image. If, in step 829 Graphics Processing Pipeline 103 determines another pass will be completed, then steps 801, 803, 805, 814, 821, 823, and 825 are repeated with the second depth and color buffers containing the front-most layers (read-only) and writing the third layer to the first depth and color buffers.

If, in step 825 Graphics Processing Pipeline 103 determines another pass through Graphics Processing Pipeline 103 will not be completed, then in step 831, Output Controller 180 reads the first or second color buffer, Whichever was written during the last pass, for output to Output 185, such as a display or the like. In an alternative embodiment, the color buffer is output via either Graphics Interface 117 or Output Controller 180 to a film recording device or written to a peripheral device, e.g., disk drive, tape, compact disk, or the like.

FIG. 8B illustrates another embodiment of a method of depth peeling in accordance with one or more aspects of the present invention. Although the method steps are described in the context of the systems illustrated in FIGS. 6A and 6B, any system configured to perform the method steps in any order is within the scope of the invention. This embodiment uses a depth and a color buffer (or a combined depth and color buffer) for each layer and includes some of the steps described in relation to FIG. 8A. In contrast to the method described in relation to FIG. 8A, sorting of the layers is completed in a single pass through Graphics Processing Pipeline 103. After the layers have been sorted one or more Execution Pipelines 640 blend the layers to produce an image for output. Conflict Detection Unit 652 is used to improve fragment processing throughput so that Execution Pipelines 640 do not need to be flushed during the single pass through Graphics Processing Pipeline 103 to avoid position conflicts. In some embodiments the four front-most layers are stored to generate the image for output.

In step 801 an Execution Pipeline 640 is configured by a fragment program to compute the fragment depth value of a fragment for a position. In step 803 Texture Unit 654 reads depth buffer values for the position from each depth buffer storing a layer of depth values for the image as specified by a fragment program. In step 804 the Execution Pipeline 640 determines if the layers need to be reordered. For example, the layers need to be reordered if the fragment depth value is between the depth values in layer 1 and the depth value in layer 2, where layer 1 is the front-most layer. The fragment depth value in layer 2 is moved to layer 3 and the fragment depth value will be written to layer 2. If layer 3 has not been used, an output buffer identifier will be assigned to layer 3 and each memory location in the layer 3 depth buffer is initialized to the furthest depth value. Likewise, each memory location in the layer 3 color buffer is initialized to transparent black. In an alternate embodiment in step 804 the Execution Pipeline 640 also performs an initial depth rejection operation, for example the fragment is culled when the fragment depth value is outside of the range defined by a minimum depth value and a maximum depth value. Specifically, the minimum depth value is the depth value stored in the front-most layer and the maximum depth value is the depth value stored in the back-most layer that has been written, i.e. is not set to the furthest depth value. When a "less than" z test is used, a fragment is rejected if its depth is greater than the maximum depth value and when a "greater than" z test is used, a fragment is rejected if its depth is less than the minimum depth value.

If, in step 804, the Execution Pipeline 640 determines if the layers need to be reordered, in step 806 the Execution Pipeline 640 determines the output buffer identifier associated with each depth value that is moved from one depth buffer (layer) to another depth buffer (layer) during reordering. The Execution Pipeline 640 also determines the output buffer identifier associated with the fragment depth value. Likewise, the Execution Pipeline 640 determines the output buffer identifier associated with each color value that is moved from one color buffer to another color buffer during reordering.

If, in step 804, the Execution Pipeline 640 determines the layers do not need to be reordered, the Execution Pipeline 640 proceeds to step 814. For example, the layers do not need to be reordered if the fragment depth value is behind the depth value in layer 1 and the depth value in layer 2, where layer 1 is the front-most layer. The fragment depth value will be written to unused layer 3 and an output buffer identifier will be assigned to layer 3. In step 814, the Execution Pipeline 640 is configured by the fragment program to produce a shaded fragment color for the fragment.

In step 820, the Execution Pipeline 640 outputs configuration control, the fragment depth value, depth buffer identifier, shaded fragment color, color buffer identifier, and reordered data to Raster Operation Unit 165. In one embodiment, the reordered data includes additional depth and color buffer identifiers corresponding to reordered layers of color and depth values. The additional depth buffer identifiers are used by Raster Operation Unit 165 to read the depth buffer values reordered in step 806. Likewise, the additional color buffer identifiers are used by Raster Operation Unit 165 to read the color buffer values reordered in step 806. In another embodiment, the reordered data includes reordered color values and color buffer identifiers and reordered depth values and depth buffer identifiers.

In step 814, Raster Operation Unit 165 writes the shaded fragment color to the color buffer corresponding to the color buffer identifier. Raster Operation Unit 165 writes the fragment depth value to the depth buffer corresponding to the depth buffer identifier. Raster Operation Unit 165 also writes each additional depth value reordered in step 806 to each depth value's associated depth buffer corresponding to each depth value's color buffer identifier determined in step 806. Likewise, Raster Operation Unit 165 also writes each additional color value reordered in step 806 to each color value's associated color buffer corresponding to each color value's color buffer identifier determined in step 806.

In step 823, the Execution Pipeline 640 determines if another fragment will be processed, and, if so, steps 801, 803, 804, 806, 814, and 820 are repeated. If, in step 823, the Execution Pipeline 640 determines another fragment will not be processed, depth sorting and shading of all of the fragments in the image is complete. In step 824, each color buffer containing a layer is read by Raster Operation Unit 165. In step 826 each position in each color buffer is blended by Raster Operation Unit 165 to produce a blended color buffer. In one embodiment the color buffers are read and the color values for each position are blended from a back-to-front order to produce a blended color value for each position. In another embodiment the color buffers are read and the color values for each position are blended from a front-to-back order to produce a blended color value for each position. In yet another embodiment, Texture Unit 654 reads the color buffers and the Execution Pipeline 640 blends the color values for each position and outputs a blended color value for each position to Raster Operation Unit 165.

In step 828 Raster Operation Unit 165 writes the blended color values to an output buffer (color buffer). The output buffer may be one of the color buffers read in step 824. In step 832 Output Controller 180 reads the output buffer for output to Output 185, such as a display or the like. In an alternative embodiment, the output buffer is output via either Graphics Interface 117 or Output Controller 180 to a film recording device or written to a peripheral device, e.g., disk drive, tape, compact disk, or the like.

The invention has been described above with reference to specific embodiments. Persons skilled in the art will recognize, however, that various modifications and changes may be made thereto without departing from the broader spirit and scope of the invention as set forth in the appended claims. For example, in alternative embodiments, the depth peeling and shadow buffering techniques set forth herein may be implemented either partially or entirely in a software program. The foregoing description and drawings are, accordingly, to be regarded in an illustrative rather than a restrictive sense. The listing of steps in method claims do not imply performing the steps in any particular order, unless explicitly stated in the claim. Within the claims, element lettering (e.g., "a)", "b)", "i)", "ii)", etc.) does not indicate any specific order for carrying out steps or other operations; the lettering is included to simplify referring to those elements.

The invention claimed is:

1. A graphics processor configured to produce data for multiple output buffers, each output buffer associated with a unique output buffer identifier, comprising:
   an execution pipeline configured to process graphics data to produce processed graphics data for the multiple output buffers and determine at least one output buffer identifier associated with the processed graphics data the data being stored in a buffer selected among the multiple output buffers by the unique output buffer identifier;
   a read interface configured to read processed graphics data associated with an output buffer identifier from an output buffer stored in a memory;
   a conflict detection unit configured to prevent position conflicts; and
   a write interface configured to write processed graphics data associated with at least one output buffer identifier to an output buffer stored in the memory;
   wherein the at least one output buffer identifier is determined by a fragment program executed in the execution pipeline, the fragment program processing first and second separated fragments within a surface, each of the fragments being written to a different one of the multiple output buffers based on a computed function within the pipeline; and
   a fragment processing unit configured to process the first and second fragments in parallel pipelines, the fragment program including a flush instruction to prevent accepting new data until all pending write operations from the output buffers to a raster operations unit are complete.

2. The graphics processor of claim 1, further comprising a rasterizer configured to process graphics data to produce fragment data.

3. The graphics processor of claim 1, wherein the output buffer identifier is readable and writable by the execution pipeline.

4. The graphics processor of claim 1, wherein any of the multiple output buffers is selected for display.

5. The graphics processor of claim 1, wherein the execution pipeline outputs data to one or more of the multiple output buffers, the unique output buffer identifier determining a base memory address of the selected output buffer.

6. The graphics processor of claim 5 wherein a memory location within the selected output buffer is computed based on the base memory address and an x, y position within the selected output buffer.

7. The graphics processor of claim 6 including a pixel input buffer configured to receive fragments from the output buffers and providing them to the parallel pipelines for processing based on the buffer identifier associated with each of the fragments.

8. The graphics processor of claim 1, wherein the execution pipeline determines position coordinates associated with the processed fragment data, the position coordinates identifying a specific location in an output buffer.

9. The computing system of claim 1, wherein the graphics processor resides within a computing system including a host processor.

10. The graphics processor of claim 1 wherein the selected output buffer is associated with the unique identifier to differentiate it from another of the output buffers.

11. The graphics processor of claim 1 including a fragment processing unit configured to process the first and second fragments in parallel pipelines, the fragment programs including a flush instruction to prevent accepting new data until all pending write operations from the output buffers to a raster operations unit are complete.

12. A method of processing graphics data for multiple output buffers the data being stored in a buffer selected among the multiple output buffers by the unique output buffer identifier, comprising:
   reading data from an output buffer using the unique output buffer identifier to provide input data;

processing fragment data and the input data read from the output buffer as specified by a fragment program to produce processed fragment data for the multiple output buffers;

determining an output buffer identifier associated with each of the separate fragments of the processed fragment data; and storing each of the fragments of the processed fragment data in an output buffer corresponding to the associated output buffer identifier wherein the data read from the output buffer is primitive data and the primitive data is processed to produce the fragment data; and a first portion of the fragment data is associated with a first light source and another portion of the fragment data is associated with a second light source, a separate shader map being defined for each of the first and second light sources and stored in a separate one of the output buffers associated with one of the unique buffer identifiers.

13. The method of claim 12, further comprising:

determining position coordinates corresponding to a specific location in the output buffer.

14. The method of claim 12, further comprising:

processing the graphics data to produce primitive data; and storing the primitive data in an output buffer.

15. The method of claim 12, wherein the data read from the output buffer is primitive data and the primitive data is processed to produce the fragment data.

16. The method of claim 15, wherein a first portion of the fragment data is associated with a first light source and another portion of the fragment data is associated with a second light source, a separate shader map being defined for each of the first and second light sources and stored in a separate one of the output buffers associated with one of the unique buffer identifiers.

17. A method of processing graphics data for multiple output buffers the data being stored in a buffer selected among the multiple output buffers by the unique output buffer identifier, comprising:

reading data from an output buffer using the unique output buffer identifier to provide input data;

processing fragment data and the input data read from the output buffer as specified by a fragment program to produce processed fragment data for the multiple output buffers;

determining an output buffer identifier associated with each of the separate fragments of the processed fragment data;

storing each of the fragments of the processed fragment data in an output buffer corresponding to the associated output buffer identifier; and wherein the processed fragment data stored in the output buffer includes fragment depth data, the depth data being stored in separate ones of the multiple output buffers specified by an output buffer identifier, the depth data being processed again with the fragment data so that only visible fragments are shaded and displayed.

18. The method of claim 17, wherein the processed fragment data is a shadow map.

19. A method of processing graphics data for multiple output buffers the data being stored in a buffer selected among the multiple output buffers by the unique output buffer identifier, comprising:

reading data from an output buffer using the unique output buffer identifier to provide input data;

processing fragment data and the input data read from the output buffer as specified by a fragment program to produce processed fragment data for the multiple output buffers;

determining an output buffer identifier associated with each of the separate fragments of the processed fragment data;

storing each of the fragments of the processed fragment data in an output buffer corresponding to the associated output buffer identifier;

wherein the data read from the output buffer is primitive data and the primitive data is processed to produce the fragment data; and further comprising comparing the depth data to a portion of the processed fragment data to perform depth peeling, and storing for each of the fragments a color in one of the buffers identified by a unique identifier and depth in another of the output buffers identified by a unique identifier, the fragments and the depth and the color being accessed for further processing based on the unique identifiers.

* * * * *